April 25, 1933. L. W. JOHNSON 1,905,102
ALIGNING FIXTURE
Filed March 20, 1929 2 Sheets-Sheet 1
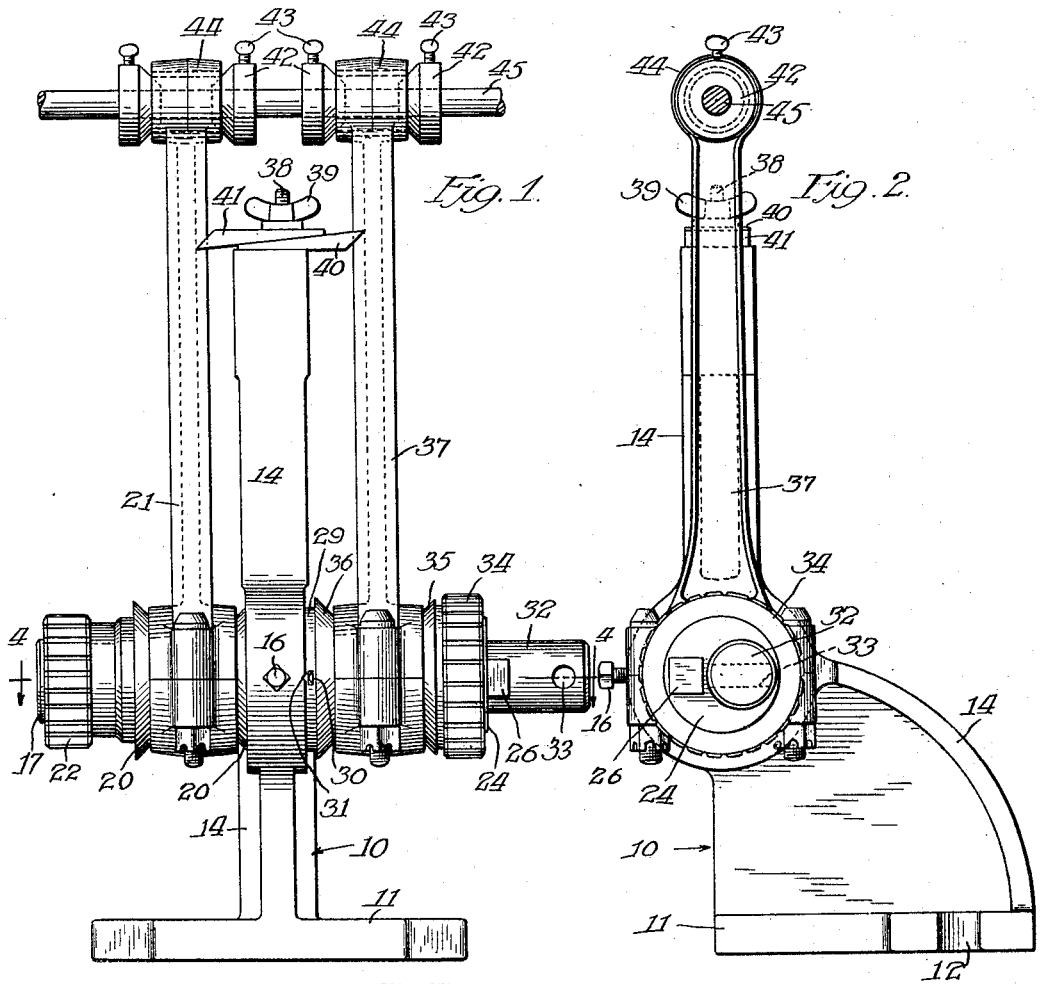
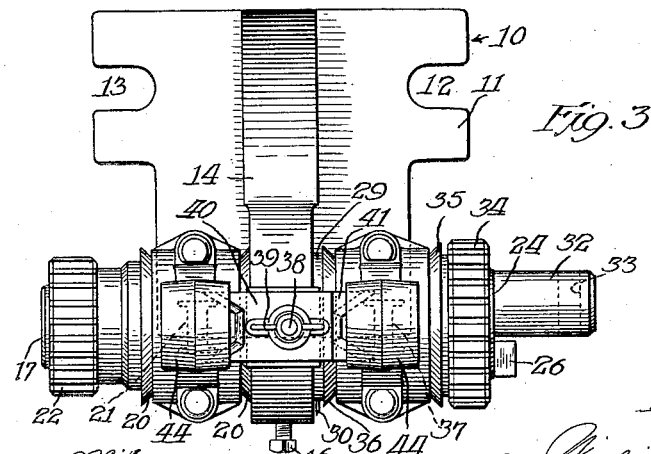
Inventor
Leonard W. Johnson April 25, 1933.　　　L. W. JOHNSON　　　1,905,102
ALIGNING FIXTURE
Filed March 20, 1929　　2 Sheets-Sheet 2

Inventor
Leonard W. Johnson

Patented Apr. 25, 1933

1,905,102

UNITED STATES PATENT OFFICE

LEONARD W. JOHNSON, OF BATAVIA, ILLINOIS

ALIGNING FIXTURE

Application filed March 20, 1929. Serial No. 348,431.

My invention relates to aligning fixtures and has particular reference to a fixture by means of which the bearing centers of connecting rods for automobile engines can be aligned with relation to each other.

A further object of my invention is the provision of an aligning fixture whereby the axes of the bearings in the connecting rods for piston heads in internal combustion engines may be properly aligned even though the connecting rods themselves may vary slightly in dimension.

In practice it has been found that due to different conditions of manufacture the connecting rods vary slightly in dimension, sometimes as much as 1/8 to 1/4 of an inch in length. Experience has taught mechanics that the only manner in which the bearings for wrist pins in pistons can be properly reamed is by aligning one fixture with another. Various devices for clamping the individual connecting rods have been devised but the centers cannot be accurately determined in these bearings due to the variations in dimensions of the connecting rods and even of the bearings themselves. Therefore it has been found necessary to align these connecting rods with each other in order to obtain the necessary accuracy in reaming out the bearings.

Another and further object of my invention is the provision of an aligning fixture whereby the centers of the wrist pin bearings of two connecting rods can be aligned, the connecting rods being held in side to side relation with each other and eccentric means being employed for moving one of said rods longitudinally to compensate for the difference in length between the two rods.

These and other objects of my invention will be more fully and better understood by reference to the accompanying sheets of drawings, and in which—

Figure 1 is a side elevational view of my improved invention with a pair of connecting rods in place;

Figure 2 is an end elevational view of the device shown in Figure 1;

Figure 3 is a top plan view of the device shown in Figure 1;

Figure 4:
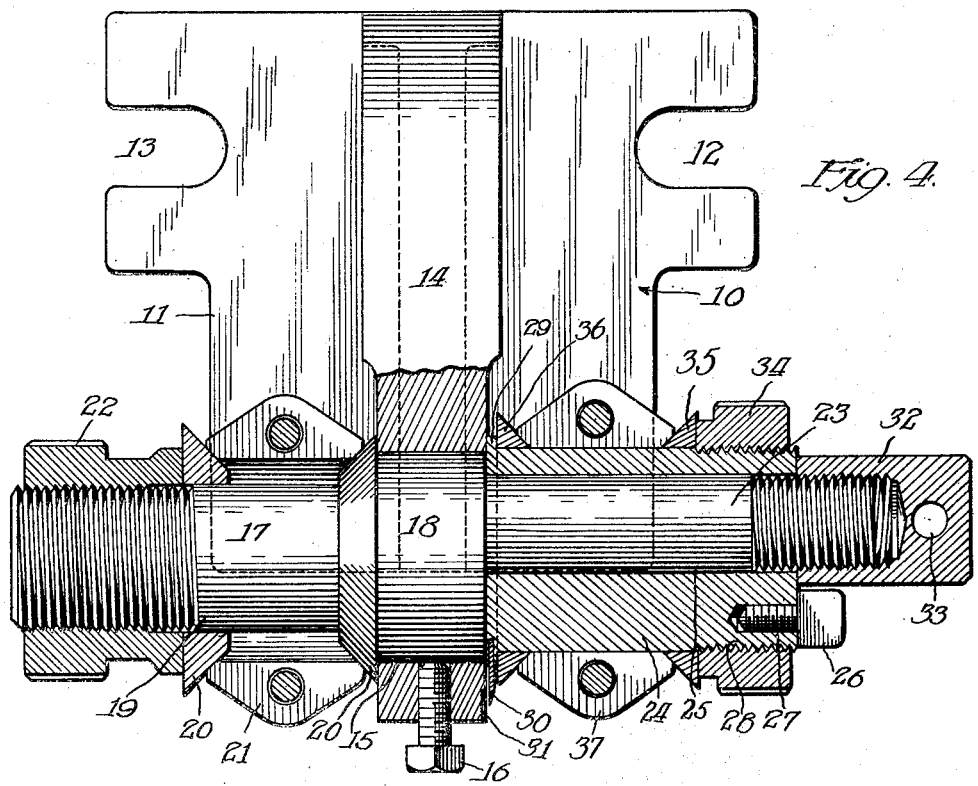
Figure 4 is a transverse view partially in elevation and partially in section along the line 4—4 of Figure 1.
Figure 5:
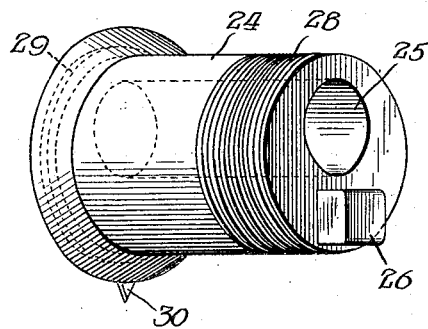
Figure 5 is a view showing the eccentric member upon which one of said connecting rods is mounted.

Referring now specifically to the drawings and in which like reference characters refer to like parts throughout, a base member designated as a whole as 10 is shown, having a foot portion 11, the said foot portion having recesses 12 and 13 formed in the sides thereof by means of which the base member 10 is secured to a bench or foundation member. Projecting upward from the foot portion 11 and formed integral therewith, is a member 14 having an opening 15 therein and having a screw member 16 mounted therein for purposes hereinafter described.

A shaft 17 extends through the opening 15 in the member 10, the said shaft having a collar portion 18 intermediate its ends and of approximately the same bore as the opening 15 so that the shaft 17 fits snugly in the member 14 and is held in position by means of the screw 16 which is tightened against the portion 18 of the shaft 17. Extending outward from the portion 18 is a portion of the shaft 19 which is less in diameter than the portion 18 of the shaft and upon which a pair of rings 20, 20 are mounted, these rings having angularly disposed sides sloping towards each other and are adapted to engage against the sides of the connecting rod 21 at the crank shaft end thereof. An internally threaded nut 22 is adapted to engage the outer end of the shaft 19 against the outer side of one of the washers 20, so that as this member is tightened the connecting rod 21 is clamped tightly upon the shaft 17 at right angles to the center of the shaft 17.

On the opposite side of the member 18 is a smaller shaft portion 23, this member being turned down to a smaller diameter than the opposite end and is positioned at one side of the center of the member 18. Mounted upon the shaft 23 is an eccentric member 24 having a bore 25 longitudinally therethrough of approximately the same diameter as the shaft 23, this bore 25 being also slightly off the center of the central diameter of the member 24 so that this member is an eccentric when mounted upon the shaft 23. A member 26 is placed in the end of the member 24 by being threaded in a recess 27 formed in the wall of the member 24, this member 26 being rectangular in shape at its outer side so that wrench can be fitted to this member by means of which the eccentric member 24 may be turned. The outer end of the member 24 is threaded at 28 and has a collar portion 29 formed on the inner end thereof which abuts against the member 14. A pointer 30 is secured to the collar 29 of the eccentric member 24 by means of which the position of the eccentric is indicated to the operator of the device. A depression 31 is formed in the end of the wall 14 at the side thereof so that when the pointer 30 is in register with the depression 31 the eccentric 24 is at the half way position and the center of the crank shaft bearing of the connecting rod thereon is in alignment with the center of the crank shaft bearing of the other connecting rod.

The outer end of the shaft 23 is threaded and has a cap member 32 which is internally threaded and adapted to fit over the threaded portion of the shaft 23, this member having an opening 33 therein by means of which the cap 32 is turned in order to tighten or loosen the eccentric 24 as may be desired.

An internally threaded nut 34 is provided which is adapted to engage the threaded portion 28 of the eccentric 24 and is adapted to abut against an outer ring 35 loosely mounted upon the eccentric 24. An inner ring 36 is also loosely mounted upon the eccentric 24, these members 35 and 36 having angularly disposed sides sloping towards each other by means of which a connecting rod 37 is secured upon the eccentric 24. The member 14 at the upper end thereof has a bolt 38 with a threaded member 39 mounted thereon, with a pair of wedge members 40 and 41 respectively having forked ends (Fig. 3) which are adapted to engage the connecting rods 21 and 37 when in position upon the fixture.

A plurality of collars 42, 42 are shown having screws 43, 43 therein, these collars having diagonally disposed sides and adapted to fit into the bearing 44 mounted in the wrist pin end of the connecting rods 21 and 37. A rod 45 is provided which is adapted to extend through the collars 42, 42, the internal opening through the collars 42 being of a diameter so that a snug sliding fit is afforded between the collars 42 and the rod 45 so that there is substantially no lost motion between the surfaces of the rod 45 and the collars 42.

In operation of the device the connecting rod 21 is mounted upon the shaft 17 by removing the nut 22 and the outer collar 20 from the shaft, whereupon the connecting rod is slipped over the end of the shaft 17, the washer 20 placed in position and the nut 22 turned up until the connecting rod 22 is clamped tightly in position upon the rings 20, 20 around the shaft 17. The inclined sides of the rings 20 automatically center the connecting rod 21 in position. Thereupon the second connecting rod is placed over the eccentric member 24 by removing the nut 34 and ring 35 therefrom when this nut is placed in position. The operator then places the cone members 42, 42 with the rod 45 extending therethrough, in position in the bearing 44 in the outer end of the connecting rod 21. The rod 45 is slipped through the bearings 44 with the pair of members 42, 42 being placed on the connecting rod 37. If the axes of the bearings 44 in each of the connecting rods 21 and 37 are coincident there will be no difficulty in inserting the rod 45 through the members 42. If, however, the axes of these bearings are not coincident it will be impossible to insert the rod 45 through the members 42 and it will be necessary for the operator to loosen the cap 32 thereby loosening the eccentric 24, placing a wrench upon the member 26 and moving the eccentric member 24 until the rod 45 can be inserted through the members 42 carried by the outer ends of the connecting rods.

After this operation is complete, the members 40 and 41 are placed in position against the connecting rods 21 and 37 and the thumb screw 39 tightened so that the connecting rods are held in fixed vertical adjustment with each other while a reamer is passed through the bearings 44 in the outer ends of the connecting rod. It will be necessary, of course, before the reaming operation to remove the rod 45 and the members 42, 42 from the connecting rods, whereupon a reamer is forced through the bearings, such as described in my copending application Serial No. 167,574, filed February 11, 1927, Patent No. 1,810,214 issued June 16, 1931. If desired, the member 45 and members 43 can be dispensed with and the bearings aligned by using the reamer and cone-shaped bearing as described in my application above identified.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A fixture comprising in combination, a base member, a shaft thereon extending outward at one side thereof, a second shaft extending outward from said base member on the side opposite said first mentioned shaft, an eccentric bearing member on one of said shafts, clamping means on each of said shafts whereby the crank shaft ends of a pair of connecting rods are secured in side to side relation with each other, and means whereby the said eccentric member may be rotated.

2. A fixture comprising in combination, a base member, a shaft thereon extending outward at one side thereof, a second shaft extending outward from said base member on the side opposite said first mentioned shaft, an eccentric bearing member on one of said shafts, clamping means on each of said shafts whereby the crank shaft ends of a pair of connecting rods are secured in side to side relation with each other, and wrench engaging means on said eccentric bearing member.

3. A fixture comprising in combination, a base member, a shaft thereon extending outward at one side thereof, a second shaft extending outward from said base member on the side opposite said first mentioned shaft, an eccentric bearing member on one of said shafts, clamping means on each of said shafts whereby the crank shaft ends of a pair of connecting rods are secured in side to side relation with each other, wrench engaging means on said eccentric bearing member, and a pair of oppositely disposed support members adapted to engage the connecting rods intermediate their ends.

4. A fixture for aligning a pair of engine connecting rods preparatory to reaming the wrist pin openings thereof comprising a base member having a portion extending upward between the connecting rods, shafts extending outward from said base member, clamping members on each of said shafts, an eccentric bearing member on one of said shafts, a wrench engaging member on the said eccentric bearing member, a pair of oppositely disposed adjustably mounted gauge and support members adapted to engage the connecting rods at their sides and intermediate their ends on the said upwardly extending portion of said base member, and a gauge member adapted to extend through the wrist pin openings of the connecting rods.

Signed at Chicago, Illinois, this 18th day of March, 1929.

LEONARD W. JOHNSON.